United States Patent [19]

Maciocia

[11] Patent Number: 5,172,874
[45] Date of Patent: Dec. 22, 1992

[54] DEVICE FOR SUPPLYING AIR TO A DOUBLE SURFACE-AERODYNAMIC-PROFILE

[76] Inventor: Yves Maciocia, 105 bis route Nationale, 69330 Pusignan, France

[21] Appl. No.: 721,528
[22] PCT Filed: Nov. 15, 1990
[86] PCT No.: PCT/FR90/00816
§ 371 Date: Jul. 9, 1991
§ 102(e) Date: Jul. 9, 1991
[87] PCT Pub. No.: WO91/07316
PCT Pub. Date: May 30, 1991

[30] Foreign Application Priority Data
Nov. 16, 1989 [FR] France ............... 89 15290

[51] Int. Cl.⁵ .............................. B64D 17/00
[52] U.S. Cl. .......................... 244/142; 244/145
[58] Field of Search .............. 244/142, 145, 152, 902, 244/123, 35 R

[56] References Cited

U.S. PATENT DOCUMENTS

| | | | |
|---|---|---|---|
| 2,993,667 | 7/1961 | Cushman | 244/142 |
| 3,822,844 | 7/1984 | Sutton | 244/145 |
| 3,944,169 | 3/1976 | Beda | 244/142 X |
| 3,972,495 | 8/1976 | Jalbert | 244/145 |
| 4,253,627 | 3/1981 | Matsao | 244/145 |
| 4,406,433 | 9/1983 | Radkey et al. | 244/145 |
| 4,811,920 | 3/1989 | Askwith et al. | 244/145 |

FOREIGN PATENT DOCUMENTS 0336277 3/1989 European Pat. Off. .
1523592 3/1968 France .

Primary Examiner—Galen Barefoot
Assistant Examiner—Christopher P. Ellis
Attorney, Agent, or Firm—Wall and Roehrig

[57] ABSTRACT

A flexible, hollow, lift-developing airfoil has a frontal air inlet, and a valveless air-filled chamber between upper and lower surfaces. The upper surface is impermeable to air. The lower surface has a permeable section which permits air to freely flow therethrough in either direction depending on differential atmospheric pressure inside and outside the chamber. When the airfoil is in horizontally advancing flight, the permeable section is not exposed to the relative wind. Under such conditions air enters the chamber through the frontal opening, and excite through the permeable section. When the airfoil is descending in a substantially vertical direction, the permeable section is exposed to relative wind, and air enters the chamber therethrough, flowing out through the frontal opening, to automatically maintain a desired aerodynamic profile.

7 Claims, 1 Drawing Sheet

DEVICE FOR SUPPLYING AIR TO A DOUBLE SURFACE-AERODYNAMIC-PROFILE

BACKGROUND OF THE INVENTION

1. Field of the Invention

The present invention relates to a device for supplying air to a double-surface-aerodynamic-profile, and typically a paraglider or a parachute. More specifically, the device according to the invention is intended to permit the supply of air to the space situated between the lower surface and the upper surface of a parachute or of a paraglider.

2. Description of the Prior Art

Traditionally, this air supply is effected by an open space, provided at the front of the paraglider, and typically representing between 1 and 20% of the total surface area of the lower surface. This air supply between lower surface and upper surface is intended to permit the advance of the paraglider or of the parachute in a plane other than the purely vertical plane of the to gravity.

Paragliders are currently known which possess at the location of their forward zone, an a-jour fabric of "mosquito net" type, but the ventilation aperture surface area of which never exceeds 20% of the total surface area of the lower surface. Now, this supply zone exhibits a surface area which is insufficient under certain flight conditions. Moreover, this zone is partially or entirely blocked when the whole or part of the front of the appliance, i.e. paraglider or parachute, becomes folded, for example on account of aerological turbulences. Moreover, this forward zone is in some instances poorly ventilated along the direction which is adopted by the appliance, and the aerodynamic profile of the paraglider is then no longer ensured correctly, leading in certain instances to a significant fall of the appliance.

In the document EP-A-0,336,277, a paraglider has been proposed, the lower surface of which is equipped with a flap valve which is liable to give rise to pressure variations at the location of the space situated between the lower surface and the upper surface. Nevertheless, this system incorporating a flap valve does not permit the maintenance of a correct aerodynamic profile of the appliance. In fact, it generates at the location of the sail of the paraglider local variations of pressure which are unsuited to slight, as these may give rise to the folding of the sail. Moreover, when using such a system it has been possible to observe phenomena of autorotation, generally leading to the falling of the appliance.

SUMMARY OF THE INVENTION

The present invention aims at alleviating these various disadvantages. It relates to a safety device for supplying air to a double-surface-aerodynamic-profile. This device is characterized in that the lower surface area or lower surface is permeable to air over at least a part of its surface area.

Typically, the lower surface may be permeable to air over the whole or part of its surface area, depending upon the ultimate intended purpose of the appliance. Accordingly, this lower surface is pierced with orifices, the surface area of which is within the range between 0.001 mm$^2$ and 4 mm$^2$. In fact, it has been noted that if the surface area of these orifices were less than 0.001 mm$^2$, the lower surface no longer exhibited sufficient permeability to air for the desired effect, and especially the effect of stabilization of the aero-dynamic-profile of the appliance and of advance of the appliance in a plane other than vertical or subvertical. On the other hand, if the surface area of the orifices of the lower surface is greater than 4 mm$^2$, the lifting function of the lower surface is no longer ensured and, furthermore, the resultant advance of the appliance cannot take place under correct conditions.

In a particular embodiment of the invention, the lower surface is formed by a free air inlet situated at the location of the forward zone of the appliance, which zone is followed by a zone constructed of a fabric impermeable to air, similar to the upper surface, and finally a part referred to as "ventilated", that is to say permeable to air, in a zone which is to the rear in relation tot he aerodynamic-profile. This particular feature is more particularly intended to promote the advance in a horizontal or subhorizontal plane of the appliance.

BRIEF DESCRIPTION OF THE DRAWINGS

The manner in which the invention may be implemented and the advantages which arise therefrom will emerge more clearly from the illustrative embodiments which follow, which are given on an indicative but nonlimiting basis, in support of the accompanying figures.

DESCRIPTION OF THE PREFERRED EMBODIMENT

Figure 1:
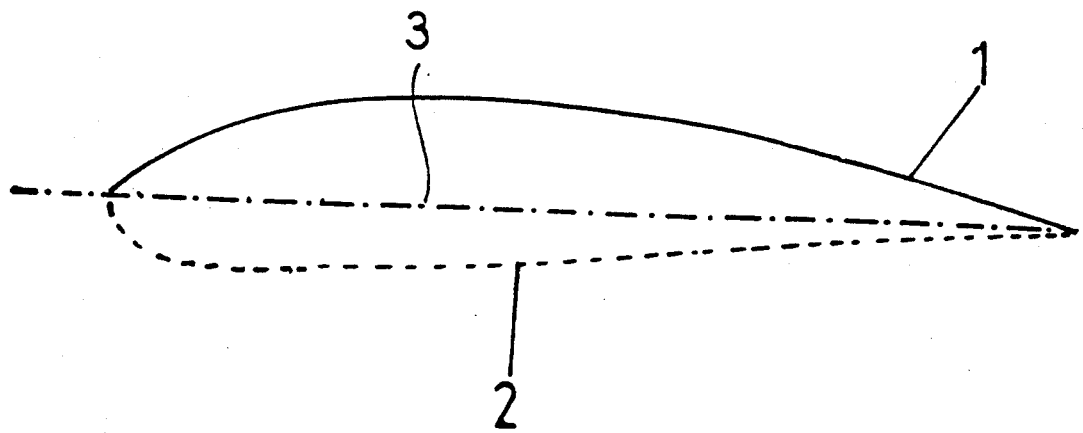
FIG. 1 shows a diagrammatic cross-sectional view of the device according to an embodiment of the invention.

As can be seen in FIG. 1, in which a diagrammatic cross-sectional view of a paraglider has been shown, the latter essentially comprises an upper surface (1) constituting the upper sail and constructed of a material impermeable to air, typically a coated fabric, and a lower surface (2) constituting the lower sail and permeable to air over its entire surface area. The upper surface and the lower surface (1) and (2) delimit the chord (3) of the aerodynamic-profile.

As has already been stated, the lower surface (2) is permeable to air. It is typically constructed of a woven or bonded material, and is equipped with orifices, the surface area of which is, for example, equal to one square millimeter.

Figure 2:
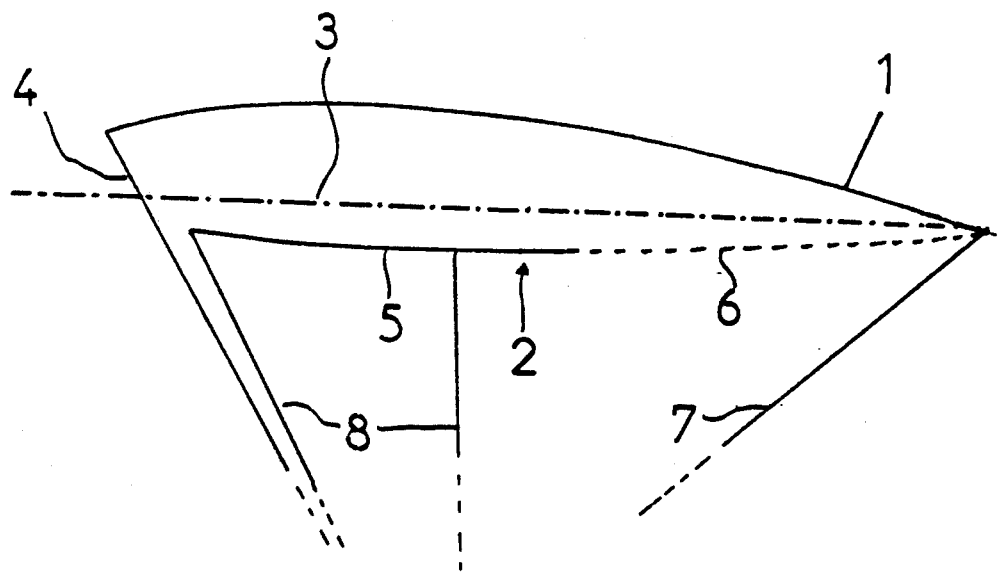
FIG. 2 shows a diagrammatic cross-sectional view of another embodiment of the invention.

In another embodiment shown in FIG. 2, the upper surface (1) is similar to that of FIG. 1, On the other hand, the lower surface is formed of two parts, respectively a first part (5), constructed of a fabric impermeable to air and situated in the vicinity of the central band of the paraglider, and, at the rear of said central band, a ventilated part (6) permeable to air and constituting the caudal part of the lower surface of the paraglider. At the rear end of this caudal part, the lower surface is made integral with the upper surface. As in the preceding case, it delimits the chord (3) of the aerodynamic-profile. Irrespective of the configuration of the lower surface (2), the surface area of the ventilated zone (6) is in all cases greater than 20% of its total surface area.

The forward part of the paraglider is constituted by a free inlet (4), permitting the air to be caught without any resistance between the lower surface and the upper surface.

FIG. 2 shows the straps (7, 8) for fixing to the harness, permitting the paraglider to be attached to the user.

In this manner, appliances are obtained, both parachutes and paragliders, the stability of the aerodynamic-profile of which is strengthened, and which are capable of ensuring an advance in a plane other than the vertical plane, this advance being favored in relation to the paragliders and parachutes which are known at the present time. Furthermore, depending upon the ultimate intended purpose of the appliance, it may be the intention to use textiles which are more permeable to air in one direction than in the other for the lower surface, for example PORCHER (registered trademark) textiles.

The mounting of this type of lower surface on a sail is conventional and does not require any specific implementation.

Such a device is particularly suitable for the construction of paragliders and parachutes, and it permits a very significant increase in safety in the course of their use, since, as a result of its structure, it induces an opening and an inflation of the sail, even where by accident the latter closes. Moreover, in the event of severe turbulences, on account of a relatively uniform distribution of the pressure, and of its self-regulation, the appliance responds in its entirety to the various air currents, without generating any folding or closure of the sail, thus emphasizing the safety character for such paragliders or parachutes.

I claim:

1. A flexible lift-developing airfoil having an air inlet in a front portion thereof, and further having an upper surface and a lower surface, and a valveless air-filled chamber therebetween, said lower surface being permeable to air over at least an appreciable part of its surface area, said lower surface further being exposed to air in said chamber at all times during flight, and permitting air to freely exit said chamber therethrough when air pressure inside said chamber exceeds air pressure outside said chamber during flight, said upper surface being impermeable to air, said permeable part of said lower surface operatively disposed so as to be substantially unexposed to relative wind force when said airfoil is in horizontally advancing flight, and to be exposed in relative wind force when said airfoil is descending in a substantially vertical direction, whereby the airfoil maintains an advantageous aerodynamic profile and does not autorotate during flight.

2. The device of claim 1, wherein said lower surface is permeable to air over its entire surface area.

3. The device of claim 1, wherein a part of a central zone of said lower surface is impermeable to air, and a part of a caudal zone of said lower surface is ventilated and permeable to air.

4. The device of claim 1, wherein said permeable portion of said lower surface comprises a fabric that is pierced with a plurality of orifices, said orifices each having a surface area in a range of 0.001 to 4.0 square millimeters.

5. The device of claim 1, wherein said permeable portion of said lower surface comprises more than 20% of the surface area of said lower surface.

6. The device of claim 1, wherein said device is a paraglider.

7. The device of claim 1, wherein said device is a parachute.

* * * * *